INVENTOR.
David C. Franks and
BY George Hildebrand
ATTORNEY.

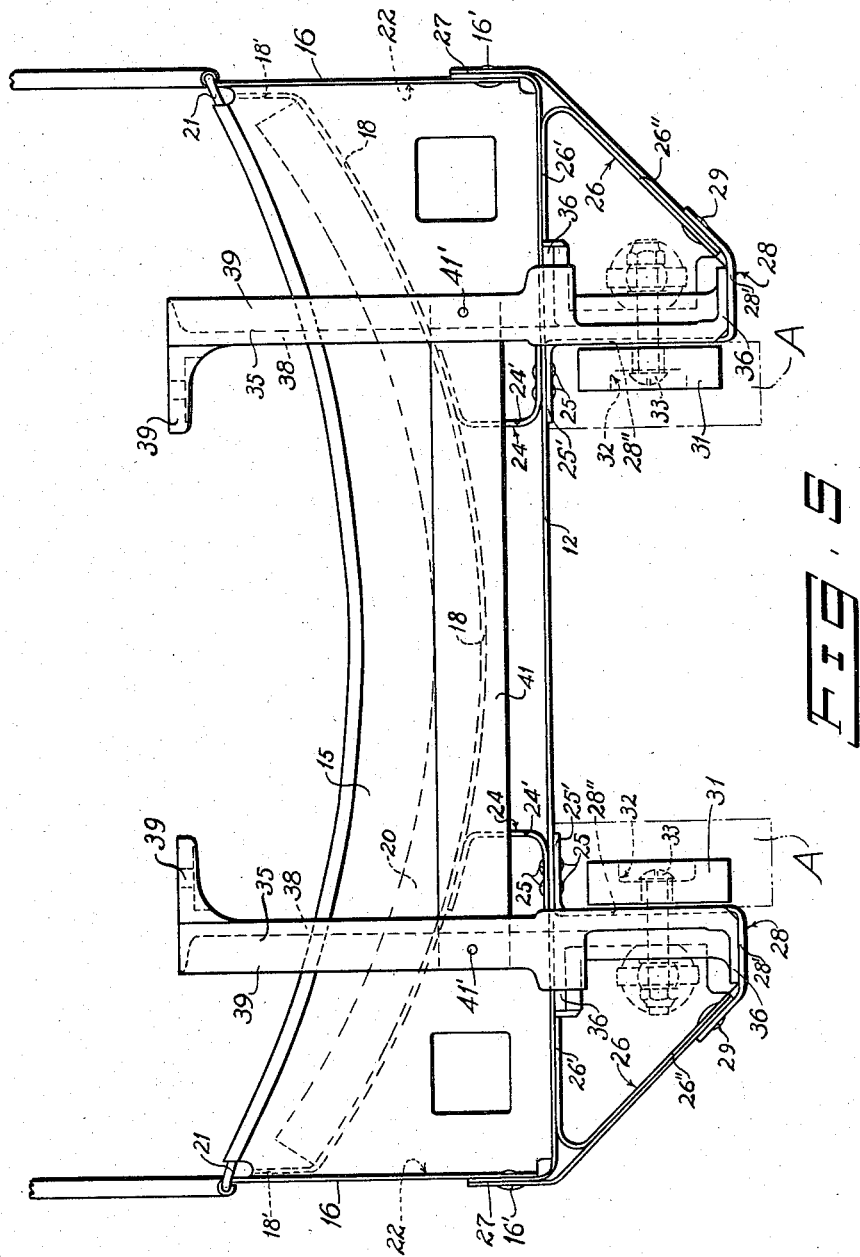

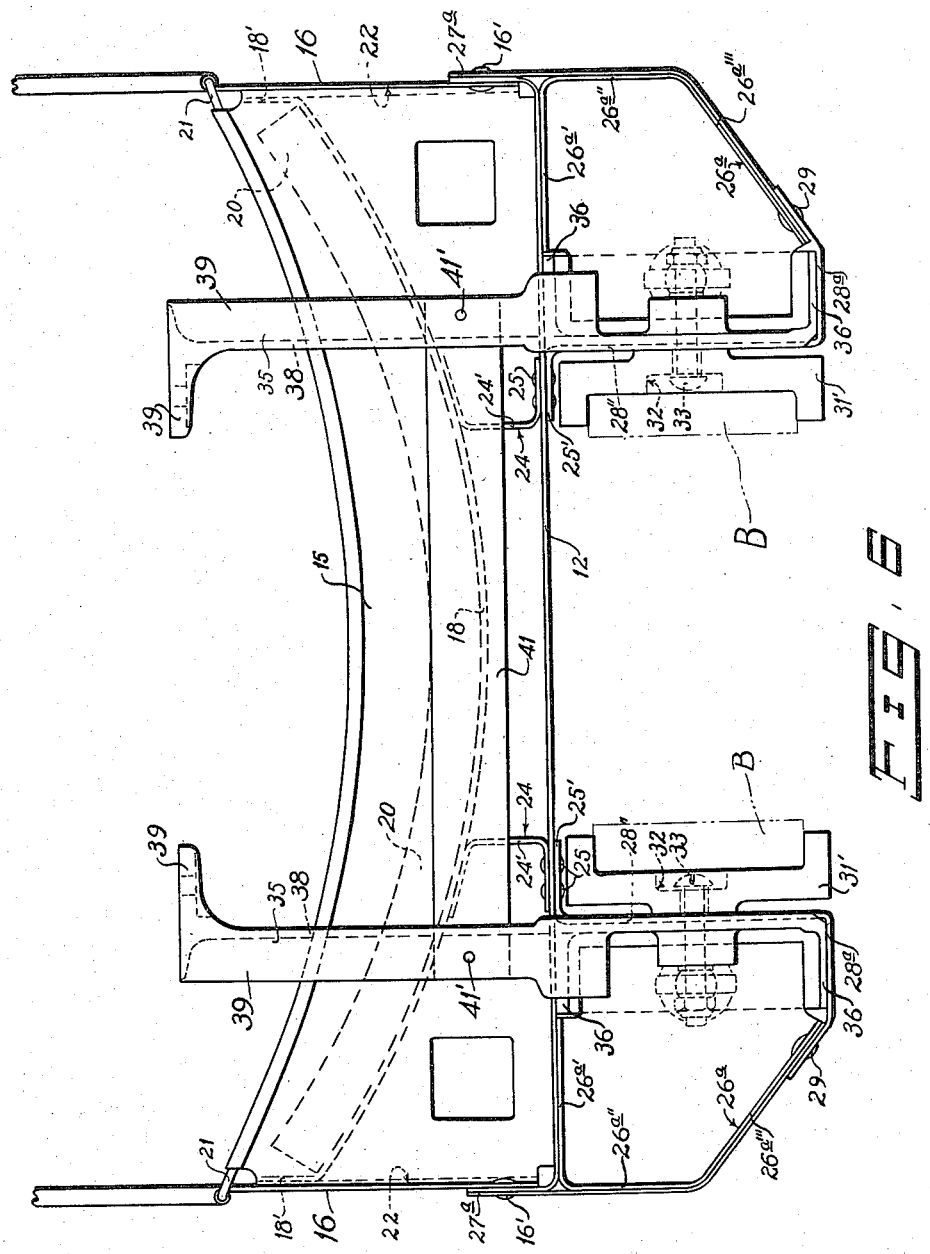

United States Patent Office 2,924,406
Patented Feb. 9, 1960

2,924,406

AIRCRAFT EJECTION SEAT

George Hildebrand, West Hempstead, and David C. Franks, New York, N.Y., assignors to Republic Aviation Corporation, Farmingdale, N.Y., a corporation of Delaware Application July 27, 1955, Serial No. 524,692

20 Claims. (Cl. 244—122)

This invention relates broadly to emergency escape systems for aircraft and more particularly to a pilot's ejection seat, the construction, operation and general design of which is such that it is readily adaptable for use in any one of the existing or presently contemplated high-speed airplanes.

In addition to flexibility of design, the present invention contemplates a pilot's ejection seat that is characterized by its strong and rigid, although light, construction and the simplicity of its operation. Moreover, consideration has been given to the pilot's comfort, and yet the gross weight of the seat has been reduced to a minimum.

With the above and other objects in view as will be apparent, this invention consists in the construction, combination and arrangement of parts all as hereinafter more clearly described, claimed and illustrated in the accompanying drawings wherein:

Figure 1:
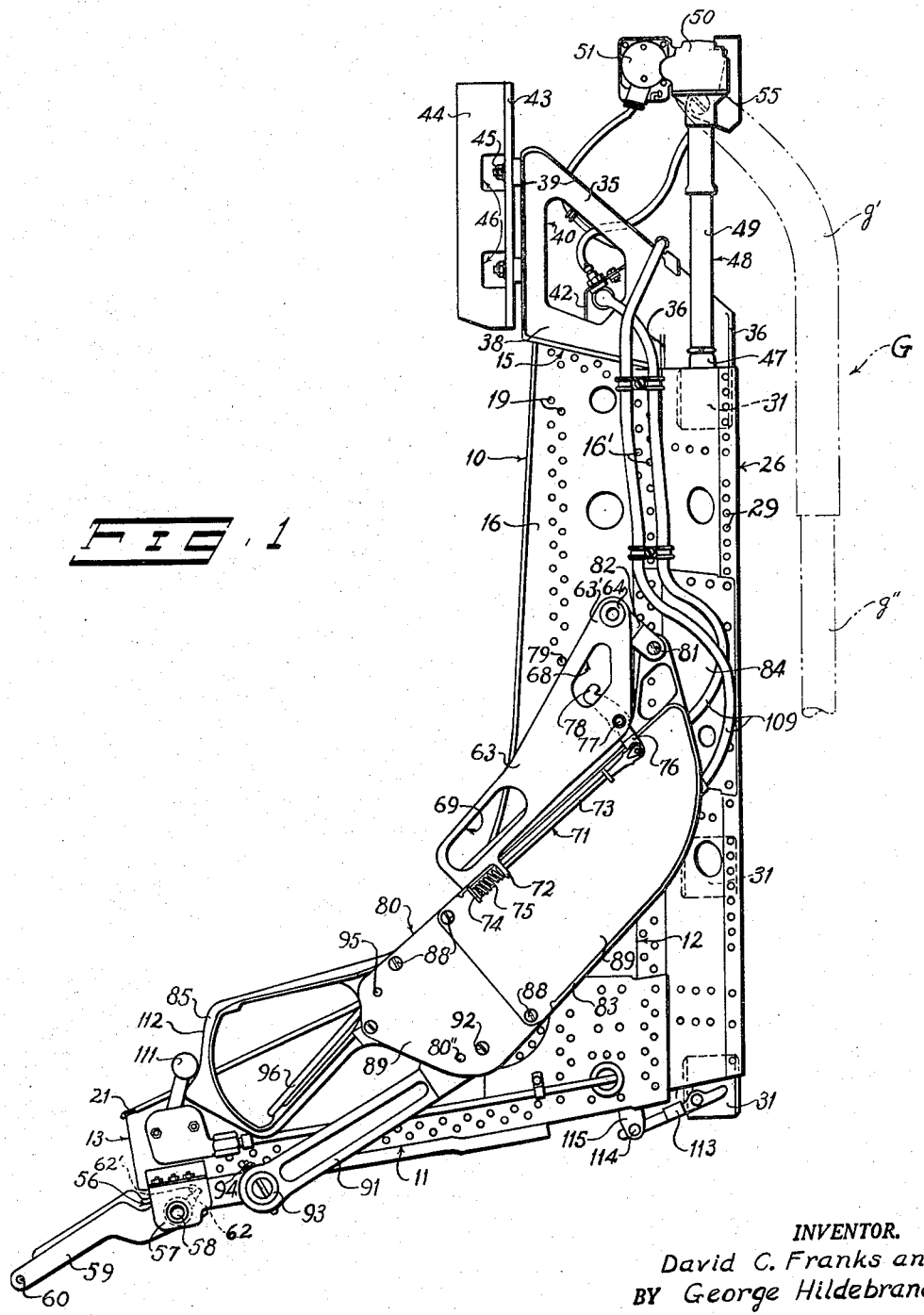
Fig. 1 is a side elevation of a pilot's ejection seat constructed in accordance with this invention to show its normal position with the actuating lever controlling the operation of all the coacting mechanisms employed in the emergency escape system including ejection of the seat, disposed and locked in its inoperative position.

Fig. 5 is a plan view of the upper portion of the seat with some of its parts removed to show the frame of the seat, its construction and the coaction between the skids and complementary fixed tracks mounted to and carried by the structure of the fuselage, said tracks being shown in phantom lines; and Fig. 6 is a view similar to Fig. 5 but shows a modification of that portion of the seat which carries the skids as well as a modification of the type of skids and cooperating tracks.

Heretofore, extensive study and development have been devoted to emergency escape systems for military aircraft. Due to the conditions under which such an escape system is used, and the importance of the system, ejection seats of the type herein considered usually have been custom-made or especially styled and designed for each individual airplane or group of airplanes. Weight being a prime factor in the design of airplanes, the prior ejection seats which have been built and employed have been found objectionally heavy.

In other words, the faster the airplane, the faster the ejection operation must be if the pilot is to be thrown clear of the airplane. This requires not only a strong and rigid seat to resist the forces acting upon it before, during and after ejection, but also rapid and spontaneous ejection.

The present invention proposes to overcome the objections to the prior ejection seats with no concurrent or accompanying reduction in its efficiency. In addition, such a construction of the seat and the operation thereof is proposed that a single standard seat generally will have universal application, i.e., it can, with only minor modification, be employed in any airplane including high-speed fighter and pursuit planes. For this reason, the instant seat may be mass-produced with standard tools which need little or no modification or variation to make substantially the same seat for many different airplanes.

Therefore, this invention has in view a seat constructed largely from sheet material, the parts of which are secured one to the other to form a hollow or box construction reinforced by a plurality of transverse ribs. This hollow box-construction is employed to enclose and house the various control mechanisms for the operation of the seat and its ejection as to accommodate all of the survival equipment such as the parachute, radio, oxygen, etc. Thus, the present seat constitutes a compact self-contained unit or package.

Additionally, means forming an integral part of the seat assembly is provided for its normal or regular flight operation as well as to control the ejection operation. This means serves to further simplify and facilitate the ejection operation in a positive manner and at the same time effects a sequential operation of the several phases or steps involved in the escape system. This sequential operation per se forms no part of the present invention, having been employed heretofore in escape systems. Similarly, the path or trajectory which the present seat follows and the other related details in the ejection or escape operation per se form no part of this invention. However, this invention proposes to follow and use the established criteria and procedures in escape operations or systems.

Where no ejection of the pilot is necessary, as for example in crash-landings, the present seat has been constructed and designed to protect the pilot, the shape of the seat being such as to encase, position and hold the pilot's body in an attitude where it best resists shock not only in being ejected from the airplane, but also whenever he is in the airplane, either in normal flight or crash-landing.

Referring now more particularly to the drawings, 10 designates the present seat assembly which consists of a bottom 11 and a back 12 both of which are flat, rectangular sheets or plates so secured at adjoining ends that one is disposed substantially at right angles relative to the other. At the forward end of the bottom 11, an upward-extending sheet or plate 13 is secured by means of and through an angle plate or bracket 14 which is riveted, or otherwise secured, to corresponding faces of the bottom 11 and plate 13 to thereby create, in effect, a right-angularly disposed flange on the forward end of the bottom 11. Similarly at the top or upper end of the back 12, a forward or outward extension plate 15 is provided. Unlike the plate 13, however, plate 15 is curved or arcuate at and along its outer or forward end for reasons to be hereinafter more clearly understood and appreciated.

Side members 16, each consisting of a flat plate, are appropriately secured one to each transverse end of the back 12 and bottom 11 to project at right angles therefrom in a forward and upward direction, respectively. The longitudinal ends of both of the plates 13 and 15 may be turned inwardly or downwardly to create a flange to overlap and abut a portion of the associated end of the side members 16 to the end that they may be secured thereto by rivets or the like to give the assembly additional strength and rigidity.

A back rest 18, having an arcuate cross-sectional shape and conforming substantially in size to the back plate 12, is disposed in spaced relationship to said back 12 on the inside thereof relative to the seat 10 so as to be coextensive therewith. The transverse ends of the back rest 18 each terminate in a forward extending flange 18' to the end that it may be secured to the associated side members 16 by means of a plurality of rivets 19. An angle plate 20 is secured to the inner surfaces of the corners formed at the junction between the back rest 18 and bottom 11 and between the back rest 18 and top extension plate 15.

The outer or free ends of the side members 16, the upper plate 15 and the front plate 13 are rolled or wrapped around a wire or rod 21 which defines or extends along their edges to give additional strength and rigidity and at the same time to present a smooth edge to prevent accidents and injury. Moreover, due to the spaced relationship between the back 12 and the back rest 18 of the seat 10, as above described, an open area 22 is created wherein an additional strengthening means may be provided. This means is so formed and positioned in the area or space 22 that substantially all of this space may still be employed to house and store accessories and equipment which form an essential part of the entire seat assembly.

More particularly, this strengthening means comprises one or more longitudinal ribs 24 each of which is coextensive with the back 12 and back rest 18 of the seat 10. Each rib 24 may be of a U or I cross-section, but in either event the opposed flanges thereof abut the adjoining surfaces of the back 12 and back rest 18, respectively, to which they are fixedly secured by a plurality of rivets 25 or the like so as to dispose the cross-piece or web 24' thereof transversely across the space 22. Thus, the area or space 22 remains substantially unobstructed and free to accommodate or house other gear, rigging and the like as may be convenient or required. If desired, the web 24' of each rib 24 may be pierced by one or more holes without appreciably weakening the assembly to further increase the effective size of the area 22 as well as to lighten the ultimate seat assembly 10.

From the foregoing it is apparent that the seat assembly 10 is, in effect, an integral unit of the so-called bucket variety. Its construction or assembly is relatively simple and yet strong and rigid. Its recessed or inset bottom and back receive the equipment and gear which is normally carried by and strapped to the pilot. The pilot's parachute, for example, may be placed on the bottom 11 and serve as a seat cushion for the pilot, following more or less conventional practice. At the same time the sides 16 are of such a width that they extend laterally of the pilot's body to partially enclose him within the seat 10.

At the aft end of the seat 10, adjacent each transverse end thereof, is a hollow member 26. In the form of the invention illustrated in Fig. 5, the member 26 is substantially triangular in cross-section and extends longitudinally of, and coextensively with, the back 12. More particularly, each of the members 26 consists of a rectangular sheet or plate which is bent or turned angularly on itself along the length thereof to create an external corner which is rounded or curved. One side 26' of the angular sheet thus formed is placed in abutting contact with the rear surface of the seat back 12 in such a way that the other side 26" is disposed in a direction inwardly and rearwardly of the associated side member 16 and seat back 12 of the seat 10.

An attaching plate 27, coextensive in length with each member 26, is secured at and along one of its longitudinal edges to the outer face of the associated side member 16 by a series of rivets 16' and, at and along its other longitudinal end, abuts the outer face of the side 26" of the member 26 to which it is appropriately secured by a plurality of rivets 29.

A second attaching plate 28, comparable to the plate 27, overlaps and abuts the marginal edge of each side 26" of the members 26 and the associated edge of plate 27 with which it is coextensive and to which it is secured by the rivets 29. Each of these plates 28 is bent longitudinally first in the direction, or toward, each other, as at 28', and then right-angularly, as at 28", in the direction of the seat back 12. At this end, the attaching plates 28 are flanged at 25' in the direction of each other to abut the rear face of the seat back 12 to which they are each secured by the rivets 25 also employed in the connection of back rest 18 to the back 12.

The modified form of the hollow member 26 illustrated in Fig. 6 and designated 26a is adapted for use where a stronger and more rigid construction is required, as will be described. Each member 26a is similar in most respects to the members 26 differing only in that it is substantially rectangular or square in section. In this case the members 26a each comprise a rectangular sheet bent longitudinally to form right-angularly disposed sides. This is effected in such a way that when the outer surface of one of the sides 26a' is disposed flush against the rear surface of the seat back 12, the other side 26a" is disposed approximately in the plane of the side member 16 of the seat 10 to form a substantially smooth and unbroken continuation thereof. The side 26a" is in turn bent longitudinally at a point medially of its width to form a side 26a''' which is angularly disposed in the direction of the other member 26a.

Attaching plates 27a and 28a, differing only in width from their counterparts, the plates 27 and 28 in Fig. 5, are formed and secured to the member 26a in the manner described in connection with the form of the member 26 shown in Fig. 5.

Referring again in particular to Fig. 5, an appropriate number of runners or skid blocks 31 are fixedly secured to each member 26, being mounted on the outer face of the side 28" thereof. The blocks 31 carried by one of the members 26 are thus vertically aligned one with the other to face those carried by the other member 26. Each block 31 of each member 26 is in addition disposed in transverse alignment with a corresponding block 31 carried by the other member 26.

The preferred number of skid blocks 31 thus carried by each of the members 26 is three, one being disposed adjacent each end thereof and the remaining block 31 disposed medially of these end blocks. The intermediate block 31 is preferably located relatively close to the lower or bottom block 31 for reasons to become more apparent in the subsequent description of the ejection operation of the seat.

Each of the blocks 31 is rectangular or square in shape and each set of blocks carried by one of the members 26 is designed and adapted to operate or slide in a coacting channelled track A (Fig. 5), immovably mounted on and carried by structure in the associated portion of the fuselage of the airplane. To this end the adjoining fuselage structure may be provided with a wall, bulkhead or the like, having a projecting rib which extends in the direction of the seat back 12 to be disposed vertically between the members 26. The tracks A which cooperate with the blocks 31 are scured to the opposed faces of this rib to receive the associated blocks 31 of each member 26. The width of each track is susbtantially equal to that of the blocks 31 so that there is substantially no lateral movement therebetween.

When the alternative member 26a of Fig. 6 is employed, the skid blocks 31' are used. These, as distinguished from the blocks 31, just described, have a generally U-shaped cross-section and are each secured to their respective hollow members 26a with their laterally disposed ends projecting outwardly therefrom and toward each other. In this case, the channelled tracks A (Fig. 5) would be replaced by the rails B (Fig. 6) organized and arranged to be received within the associated blocks 31'. The size or cross-sectional area of each rail B is substantially equal to that of the space defined by the laterally disposed ends of the U-shaped blocks 31'.

Such a modification in the construction of the skid blocks 31 and 31' is an important part of this invention in that it permits the larger and heavier element, be it skid or the guiding track or rail, to be reduced in size and weight to a minimum. Thus, in cases where a relatively large catapult device or gun is employed to fire or blow the seat from the aircraft, employment of the blocks 31 and members 26 (Fig. 5) would necessitate the use of unduly large and heavy tracks A in order to withstand the lateral loads or forces imposed thereon in the ejection operation. However, by employing the skid blocks 31' and members 26a (Fig. 6) in this application, and the comparatively small and light rails B, the overall weight is reduced to a minimum since only the relatively short or small blocks 31' are strengthened in order to take the increased loads.

It is thus apparent that, while the seat 10 is secured against lateral movement relative to the fixed tracks A or rails B, as the case may be, of the fuselage through the connection of the blocks 31 or 31', it is capable of and free for vertical movement.

In order to mount the skids or blocks 31 or 31' for movement in or on the tracks or rails A or B, each block is provided with a recess or well 32 centrally disposed in its outer face. This recess 32 accommodates the head of a bolt or bolts 33 which secure the block to its member 26 or 26a. In this way, each of the bolts 33 is countersunk or terminates inwardly of the outer face of its respective block 31 or 31' so as to be spaced from and out of contact with the coacting surface of the associated track A or rail B. In addition, each of the blocks 31 is made of a suitable, highly abrasive resistant material such as, for example, Micarta, Teflon or the like, to prevent its unduly rapid wear as a result of movement or sliding in the track A or on the rail B in the above manner.

At the upper end or top of the seat 10, a pair of spaced upstanding structural brackets 35 is fixedly secured or bolted to the upper face of the plate 15 in any suitable manner. At the aft end each of these brackets 35 terminates in an integral, depending extension which projects into the open end of the associated member 26. The face of each of these extensions is provided with a pair of spaced, lateral flanges 36 which project outwardly thereof to abut the inner surfaces of the associated member 26 to which it is immovably secured by the bolts 37. That portion of each of these brackets 35 forward of this depending extension comprises a central web 38 defined by a lateral integral flange 39. The central portion of the webs 38 is cut out, as at 40, for lightening as well as other purposes to be hereinafter described.

A transverse bar or rod 41 interconnects the brackets 35 extending across the bottom and medially of the length thereof to add structural rigidity and strength to the assembly. Bolts or other attaching means 41' secure the opposite ends of the rod 41 to the brackets 35. A transverse, angular plate 42 supplements the rod 41 being disposed in spaced relationship to the rod 41 and interconnecting the brackets 35 at points vertically above, and also forward of, the rod 41.

A flat, generally rectangular armour plate 43 is secured adjacent its opposed ends to the forward or outer faces of the flanges 39 of the brackets 35. A head rest 44 of resilient and energy-absorbing material abuts, and is fixedly secured to, the forward face or front of the armour plate 43 by means of the bolts 45. The portions of the head rest 44 which define the area thereof associated with the bolts 45 are cut away or recessed, as at 46, to permit access to these ends of the bolts 45 to facilitate the assembly thereof. The front or face of the head rest 44 is recessed or dished out, as at 44', at and along its vertical centerline to receive and cradle therein the back of the pilot's helmet or head.

At the upper aft end of the seat 10, within the open end of each member 26, an upward-facing bearing or socket member 47 is immovably secured by any suitable means so as to become, in effect, an integral part of the seat assembly. Each of the socket members 47 is designed and adapted to receive one end of a screw jack 48. At its opposed end, each screw jack 48 is received within, and connected to, a depending tube or cylinder 49 which is mounted on the outer end of, so as to be carried by, a yoke 50. Thus, the yoke 50 and the screw jacks 48 carried thereby are symmetrically disposed across the top of the seat 10 in a plane normal to the vertical centerline thereof.

Figure 3:
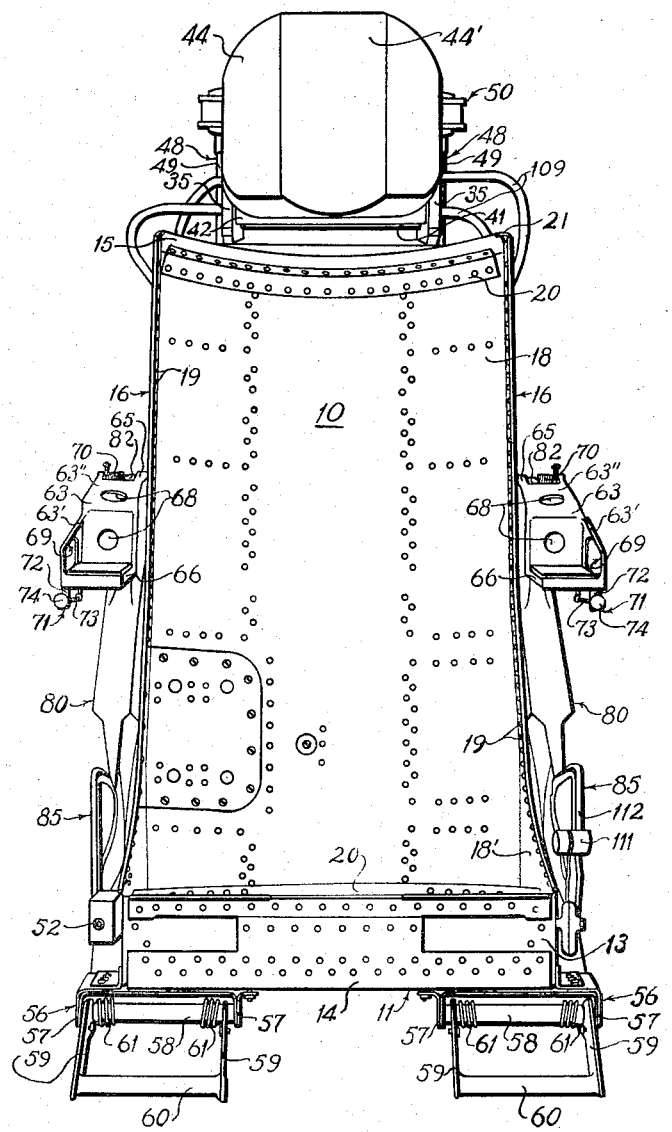
Fig. 3 is a front elevation of the present seat, as seen from the left in Fig. 1, the pilot's arm rests being shown elevated.
Figure 4:
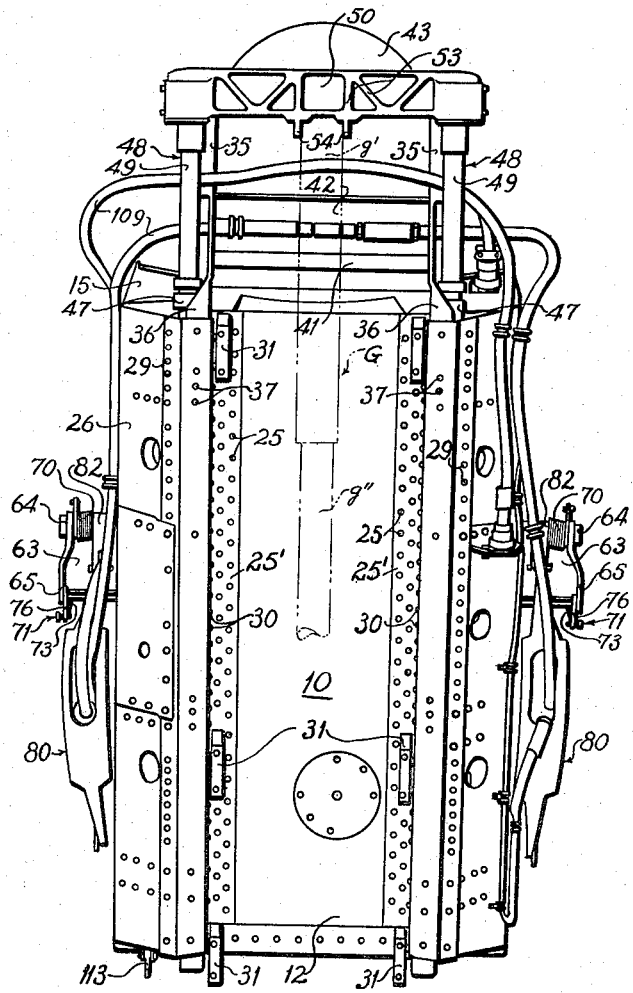
Fig. 4 is a rear elevation of the present seat, as viewed from the right in Fig. 1, with the pilot's arm rests raised as in Fig. 3, to illustrate the construction and mounting of the skids or blocks carried by the seat.

An electric motor 51 is mounted to the yoke 50 at the center thereof and operatively connected in any suitable and well-known manner to each of the screw jacks 48 for the operation thereof in unison. A control switch 52, conveniently located on the seat assembly 10, such as for example at the forward end thereof, on the outer face of one of the side members 16 (Fig. 3), is provided to regulate and control the operation of the motor 51. Hence, upon operation of the control switch 52 by the pilot of the airplane, the effective length of the screw jacks 48 may be regulated and adjusted. Due to the particular manner in which the seat assembly 10 is mounted in, and connected to, the fuselage of the airplane, as will be explained, this adjustment of the screw jacks 48 serves to position the height of the seat.

The yoke 50 is a relatively solid member of heavier construction than that of the seat itself. It is preferably a one-piece forging, the intermediate portion of which has an I cross-section, the opposed flanges of which are strengthened or reinforced by a plurality of integral gussets 53. At its center, the yoke 50 is provided with a pair of spaced, integral projections or ears 54 which extends outwardly and downwardly to receive the free end of a catapult device or gun G which is pivotally mounted therebetween. This catapult or gun G per se forms no part of the subject invention and is not a component of the unitary seat assembly or package as such. Guns of this type come in standard sizes depending upon the force or the pounds of pressure they deliver. Generally, they consist of an outer cylinder or tube g' and an inner, telescoping cylinder or tube g''. The outer opposed ends of both tubes are closed. Fluid under pressure is trapped or, in the alternative, a cartridge or powder is deposited within the tubes which are then locked in the fully telescoped position. The inner cylinder g'' is secured to the structure of the airplane within the fuselage and the outer cylinder g' is connected at its outer end to the projections 54 of the yoke 50.

Until such time as it is desired to eject or jettison the seat 10, the cylinders of the catapult device or gun G remain locked in their fully telescoped position. During all of this time the catapult device serves as a rigid or fixed length member to secure the yoke 50 in a fixed position relative to the fuselage structure. Thus, when the control switch 52 is operated by the pilot, as above set forth, the screw jacks 48 are extended and retracted to move the seat 10 vertically relative to the fuselage by means of and through the operation of the skid blocks 31 or 31' in the fixed tracks A or rails B.

Therefore, when the ejection operation is effected, by unlocking the telescoping cylinders g' and g'' and/or firing the cartridge or powder whereby the seat 10 is blown or jettisoned from the airplane, the entire force of the catapult or gun G is delivered against and taken by the yoke 50. The outer cylinder g' of the gun G, which is connected to the yoke 50, remains attached to and goes with the seat while the inner cylinder g'' remains fixedly connected to the structure of the fuselage.

In order to prevent damage to the pilot by the free-swinging inner cylinder g' of the gun G, which is pivotally connected to the yoke 50 as aforesaid, a bumper or energy absorber 55 is provided on the yoke 50, being fixedly secured thereto and projecting from the rear face thereof. This absorber 55 is composed of a resilient material and is adapted to receive and cushion cylinder g' if and when it should rotate about the yoke 50. In such a case it might conceivably strike the otherwise rigid yoke 50 and wrap or bend itself around the top of the yoke to strike the pilot who is, at this time, sitting immediately forward thereof.

At the forward end of the seat 10, adjacent either side thereof, is a trunnion bracket 56. Each of these trunnion brackets 56 is fixedly secured to the outer or lower face of the seat bottom 11 whereby the ears or trunnion bearings 57 at the outer opposed ends thereof are disposed in a downward direction. A torque tube 58 is rotatably mounted at its opposed ends in each pair of trunnion bearings 57 of the brackets 56. The laterally disposed arms 59 of a stirrup-type foot-rest 60 are fixedly secured, or keyed, adjacent each end of the torque tube 58 adjacent the inner face of each bearing 57. Hence, the foot-rests 60 are so disposed relative to the seat 10 that each receives and supports the instep of each foot of the pilot when seated in the seat 10.

Inwardly and adjacent the laterally disposed arms 59 of each stirrup 60 is a torque spring 61 which encircles the associated torque tube 58. These springs 61 are each secured at their opposed ends to the tube 58 and adjoining fixed structure of the seat 10 or trunnion bracket 56 to tend always to rotate the stirrup 60 in a downward direction. A lateral projection 62 is integrally formed in such a manner and so positioned on the inner end of each arm 59 that it contacts fixed structure of the seat bottom 11 such as a stop pin 62' or the like to thereby limit the downward rotation of the associated stirrup 60 under the action of the springs 61. The position and coaction between the projections 62 and their respective stops 62' is such as to so dispose a man's feet when he occupies the seat 10 that the lower section of his legs and the angle of his knees are maintained in a predetermined position during the ejection operation. In this way the pilot will be best able to absorb and withstand the forces and pressure to which he is subjected while being jettisoned with the seat from the airplane at high speeds.

A pair of arm rests 63 is pivotally connected, as at 64, one to either side of the side members 16 of the seat 10 medially of their length and adjacent the outer surface thereof. These pivots or bolts 64 are disposed in alignment one with the other on opposite sides of the seat 10 from which they project outwardly. Each of the arm rests 63 terminates at its aft end in a fork 65 through which the associated bolt 64 passes and on which the arm rest 63 is mounted for rotation.

The arm rests 63 are identical one with the other and each is formed to extend from its fork end 65 in progressively wider sides 63' to a point substantially midway of its length. This portion of each side 63' is joined across its upperend by an integral plate or web 63''. At a point substantially half way in the length of each arm rest 63, the inner side terminates and the outer side tapers gradually to its outer end, the lower edge thereof being disposed in a plane substantially parallel to the web 63''. The web or plate 63'' is turned or bent vertically in a downward direction to extend along the terminating end of the inner side 63' at right angles thereto and to the lower horizontal edge of the outer side 63'. At the lower end of the outer side 63' the web 63'' turns and extends forwardly as at 66, being coextensive with the outer side 63' and normally disposed relative thereto throughout the remainder of the length of this outer side. Thus, the arm rests 63 are hollow or of substantially a box construction, each having a U-shaped section at its aft end and an L-shaped section at its forward end, the bases of the U- and the L-shaped sections, i.e. the web 63'' and extension 66, being substantially parallel.

The sides 63' and webs 63'' of the arm rests 63 may be pierced, if desired, by one or more lightening holes 68 with no appreciable affect in the strength and rigidity of the construction. Such a lightening hole 69, provided in the outer side 63' adjacent the forward end thereof, serves the additional purpose of a hand grip by which the arm rest may be rotated by the pilot on and about its pivot 64 in its adjustment.

A counter-balancing spring 70 is mounted on each of the pivots or bolts 64 to be disposed between the fork end 65 of the arm rest 63 to facilitate rotation of the arm rest to and from positions where the extension 66 thereof is substantially horizontal relative to the seat bottom 11. At the same time, these counterbalancing springs 70 serve to retain their associated arm rest 63 in either position that it happens to be at the moment.

In order that the arm rests 63 may be locked in the up or horizontal position relative to the seat 10, an automatic lock mechanism 71 is associated with each arm rest 63. For this purpose a depending ear 72 is formed on the lower or under surface of each arm rest 63 adjacent the forward end thereof. An aperture pierces the depending ear 72 for the passage therethrough of a reciprocating rod 73. This rod terminates in an enlarged, lateral projection or head 74 and a compression spring 75 is mounted on the rod 73 between the ear 72 and the head 74 to always tend to move the rod outwardly of the arm rest 63.

Figure 2:
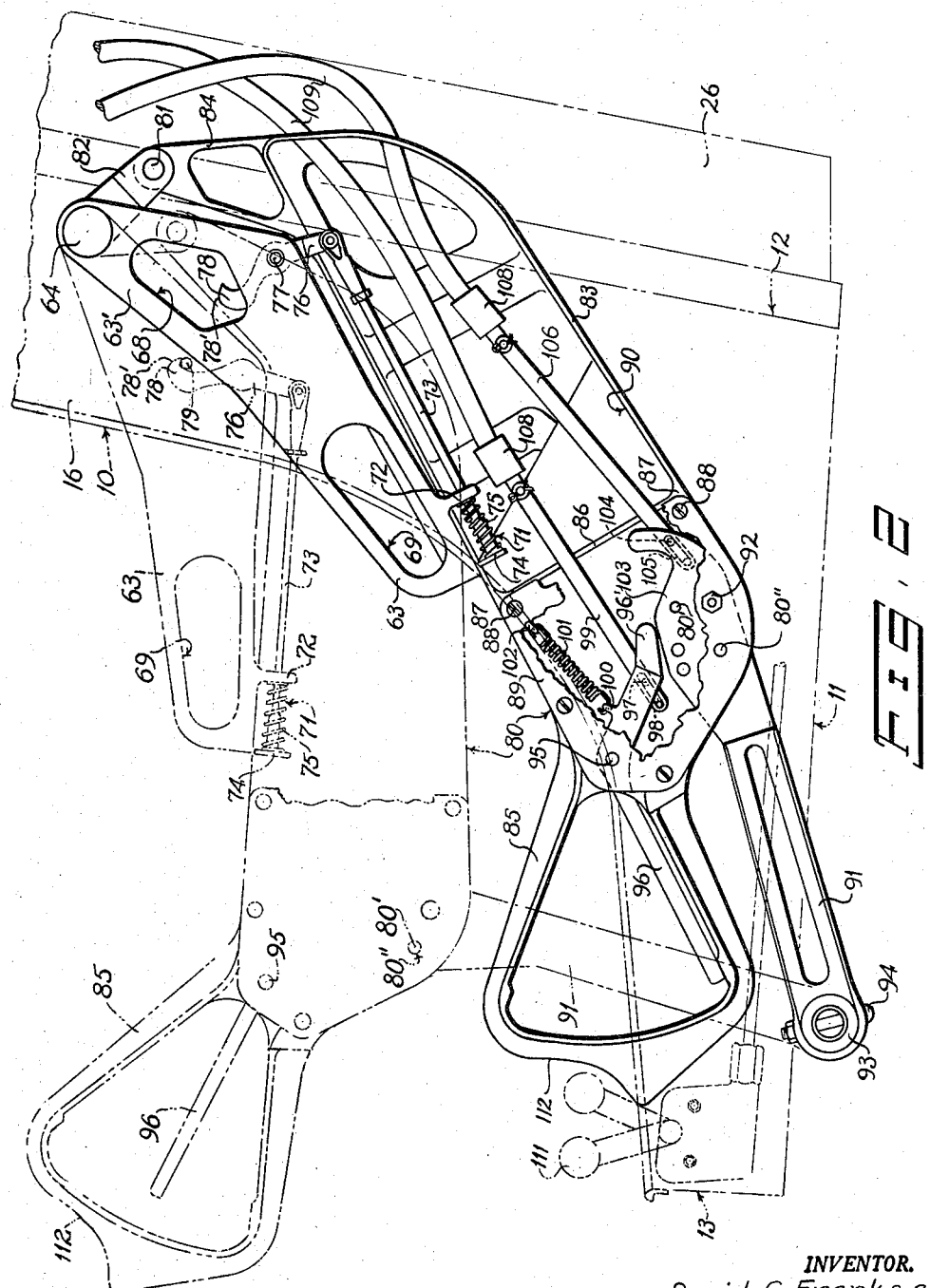
Fig. 2 is a side elevation of the operating lever and arm rest of the seat illustrated in Fig. 1 to show the extreme positions thereof, the outer wall or housing of said lever being broken away to reveal the mechanisms housed therein in their disconnected or inoperative positions, the associated portions of the seat and the position of the operating lever for ejection being shown in phantom lines.

At its aft end the reciprocating rod 73 is pivotally secured to the outer end of a bellcrank lever 76 which is rotatably mounted on a pivot pin 77 carried by sides 63' of the arm rest 63 and disposed transversely across the space defined thereby. Thus, the bellcrank lever 76 is disposed in the hollow U section of the arm rest 63 and terminates, at its opposite end, in a hook 78. When the arm rest 63 is rotated about the pivot 64, as it is raised by the pilot, the hook 78 on bellcrank lever 76 is moved in a clockwise direction relative to the pivot 64 (Figs. 1 and 2) to a point where its outer arcuate edge 78' strikes the periphery of a retaining stud 79 secured to and projecting outwardly from the associated side member 13 of the seat 10. Continued upward movement of the arm rest 63 by the pilot causes the bellcrank 76 to be rotated in a counterclockwise direction on its pivot 77 against the action of the spring 75 until such time as the edge of the hook 78 has passed over and around the stud 79. The stud 79 will then be locked or held within the hook 78 under the normal action of the spring 75. In this way arm rest 63, once it has been raised to the horizontal position, is held in this position against the weight of the pilot's arm resting thereon.

When the pilot desires to lower the arm rest out of his way, he simply presses against the head 74 of the lock mechanism 71 to thereby rotate bellcrank lever 76 in a counterclockwise direction (Figs. 1 and 2) against the action of the spring 75. This moves the hook 78 of the bellcrank 76 out of locking engagement with the retainer 79 and the arm rest may be moved downwardly.

The foregoing describes the entire normal or flight operation of the present seat and all of the elements and mechanisms thereof which are involved. In short, by means of and through the elements thus far described, the pilot of the airplane in which the present seat is mounted has immediate access to the means (control switch 52) by which it is adjusted vertically to the desired position. At the same time the pilot may raise or lower the arm rests 63, as he chooses, to add to his comfort during normal flight of the airplane. Similarly, by the weight which he cares to impose on the foot-rests 60, these can be positioned, within predetermined limits, to suit his comfort. The details of construction and operation of the mechanism now about to be described relate to emergency operation of the seat, that is, its ejection and for insurance against ejection at undesirable times, such as during normal flight or crash-landing of the airplane.

A single, emergency, actuating arm or lever 80 is provided. While such a lever 80 is, in fact, mounted on either side of the seat 10, as will be described, due to the direct interconnection of both of these levers, one to the other for the operation thereof in unison, they constitute, in effect, as far as their actuating function is concerned, a single lever. Through this dual lever arrangement, initiation of the ejection operation may be effected by the pilot with either or both hands. Other advantages of this arrangement will become apparent in the subsequent disclosure of the ejection operation.

Each of the levers 80 is pivotally mounted, as at 81, to the outer or free end of a connecting lever 82 which is fixed mounted for rotation at its other end on the bolt 64. This fixed end of lever 82 is disposed on the bolt 64 between the inner end of the counterbalancing spring 70 and the inner face of the fork 65. The function of this connection is to create a joint between each lever 80 and its pivot 64 whereby said lever resists upward rotation on its pivot. Before such rotation of the levers 80 can be effected, the joint must first be straightened by forward movement of the lever relative to the seat 10. This reduces the possibility of the levers being rotated to their upward position accidentally or inadvertently due to sudden vibration or jolt such as might accompany a crash-landing of the airplane.

The levers 80 each consist preferably of a single flat forging formed with a right-angularly disposed flange 83 at and along the perimeter thereof. When connected to its pivot 81, the flat side surface of each lever 80 is positioned adjacent and parallel to the associated side member 16 of the seat 10. The pivoted end of each lever 80 is angularly disposed, as at 84, and so engages the pivot or bolt 81 that the upper flange 83 thereof abuts the lower or under surface of the associated arm rest 63 when said arm rest is in its down position.

At its forward end, each lever 80 terminates in an open loop or handle 85 which is an integral extension of the flange 83. If desired or required, relatively thin or narrow gussets 86 may be formed on the inner surface of the forged, flat side of each lever 80 for added strength and rigidity.

At and along the inner surfaces of the flanges 83, a plurality of lobes or bosses 87 is integrally formed each being provided with a central, threaded opening for the reception of a coacting screw or bolt 88. One or more flat plates 89 having a shape and area when assembled to conform to that of the flat side of the forged lever 80 may thereby be disposed in abutment against the outer edge of the flanges 83 and secured thereto by the bolts 88 whereby the main portion of the lever 80 is enclosed to create a chamber 90 therein.

The lower flange 83 of each lever 80 is interrupted or broken at and along its length adjacent the forward end of the lever 80 for the passage therethrough of one end of a supporting strut or arm 91. Each arm 91 is pivotally connected to the associated lever 80 by a bolt or pin 92 which is secured to the opposite, transverse sides of the lever 80 whereby this end of the arm 91 is located within the chamber 90 of the lever 80.

At its other or outer end, each supporting arm or strut 91 is fixedly secured or keyed to the outer end of a torque rod or tube 93 by a bolt 94 or its equivalent. This torque rod or tube 93 is secured to the under surface of the seat bottom 11 in any suitable manner and extends from one side of the seat to the other for the interconnection of the actuating levers 80 whereby they move in unison.

Adjacent the upper forward end of each lever 80 is a pivot pin or bolt 95 which is secured at its ends to the opposed sides of said lever whereby the central portion thereof traverses the chamber 90 within the lever 80. A trigger or bellcrank lever 96 is mounted medially of its length on the bolt 95 whereby the outer portion thereof is disposed within the loop or handle 85. At its other end, disposed within the chamber 90 of the lever 80, the trigger 96 is provided with a fixed projection or stud 97 which is adapted to receive the slotted end 98 of a reciprocating rod 99. Medially of its length, the inner end of the trigger 96 is formed with a laterally projecting eyelet or keeper 100. A tension spring 101 is mounted at one of its ends in the eyelet 100 and at its other end to an eyelet or keeper 102, like 100, integrally extending from the inner surface of the upper flange 83 of the lever 80. Thus, the trigger 96 is held in its downward position in abutment against the inner face of the loop or handle 85 under the normal action of the spring 101. At the same time the stud 97, adjacent the inner end of the trigger 96, is disposed inwardly of the slotted end 98 of the reciprocating rod 99.

At the inner end of each of the struts or arms 91, a hooked extension 103 is integrally formed thereon to project into the chamber 90. A stud or fixed projection 104 is provided on the inner face of each of the extensions 103 to receive the slotted end 105 of a reciprocating rod 106. This stud 104 and slot 105 in rod 106 are identical in every respect to the elements 97, 98 and 99 already described in connection with the trigger assembly 96.

The reciprocating rods 99 and 106 are each connected at their other ends to independent initiator mechanisms designated generally as 108. These initiators 108 are connected at their other remote ends through suitable and well-known connections such as the electrical cables 109 to the canopy unlock device, the energizer for the canopy jettison mechanism, other initiators for the operation thereof in sequence and in advance of the seat ejection operation and finally the seat catapult initiator for ultimate ejection of the seat 10. These various mechanisms at the remote ends of the cables 109 per se form no part of this invention and have, therefore, not been included in this disclosure. Standard devices may be employed and since the connection of the cables 109 thereto may be accomplished in any well-known and common manner, it is thought that this invention is thereby more clearly understood. As far as the present invention is concerned, means are contemplated and included within the hollow levers 80 for the automatic and sequential initiation of remote devices, the operation of which is necessary prior to the ejection of the present seat 10.

When the pilot desires to jettison himself and the seat 10 from the airplane, he simply raises one or both of the actuating levers 80 to the horizontal position. This movement of the levers 80 serves to also force the arm rests 63 upward to their horizontal position, if they have not already been so raised by the pilot. Simultaneously, the strut or arm 91 is rotated on its pivot 92 to move the stud 104 longitudinally in the slot 105. When the stud 104 strikes the end of the slot 105, the reciprocating rod 106 is actuated or pulled to operate the associated initiator mechanism 108.

While the hooked extension 103 on the inner end of the strut 91 is being thus rotated, it contacts and engages a dog 96' on the inner end of the trigger 96 whereby said trigger is rotated concurrently with the arm 91 for the remainder of the distance traveled by said arm to its fully upward position. The stud 97 is thereby moved to the forward end of its slot 98 where continued movement of the lever 80 serves to pull or reciprocate the rod 99 for actuation of the associated initiator mechanism 108.

In order to hold or retain the levers 80 in their up or horizontal position once they have been so moved by the pilot, a lock is associated with each lever. This lock consists of a spring-loaded stud or detent 80' mounted in and projecting outwardly of the outer face of the arm 91 to normally abut the inner face of the associated cover plate 89 when the levers 80 are down. However, when the pilot raises the levers 80 to their horizontal or operative position, the detents 80' are moved to a position where they register with a complementary aperture 80" provided in the associated plate 89. When so disposed, the detents 80' are forced outwardly of the arms 91 under the action of their springs to project into their complementary apertures 80" whereby the arms 91 and their associated levers 80 are locked one to the other against relative movement.

The levers 80 have thus been moved to and locked in a position to extend, in effect, the side members 16 to further enclose the pilot's body therebetween and more particularly his legs or thighs whereby his knees are held together.

When one or both of the triggers 96 have been pulled by the pilot and the initiator 108 operated for the actuation of the catapult operating control, the gun is simultaneously unlocked and fired on and against the yoke 50. As above described, this forces or drives the seat 10 longitudinally of its tracks A or rails B. In this way the seat 10 with the pilot therein is jettisoned from or out of the airplane.

On the seat 10 at the forward end thereof is an operating lever 111 for the control of the harness apparatus or straps which are conventionally employed on all seats to secure or hold the pilot therein. This harness apparatus per se forms no part of this invention and, therefore, is not illustrated in the drawings. Its function is as stated, to hold the pilot snugly in the seat and to this end consists generally of a plurality of slings or straps which pass around and about his body, being secured at one end to the seat. All of these straps usually come together when connected in a buckle or similar fastening device at the center of the pilot's body or chest.

In order that the pilot may have freedom of movement, therefore, during normal operation or flight of the airplane, the operating lever 111 is provided to permit him to unlock the harness apparatus at or adjacent the ends thereof connected to the seat 10. Thus, when the lever 111 is pulled back (the position shown in Fig. 1) by the pilot, the harness is unlocked and thereby allowed to extend its length to accommodate greater movement of the pilot. When the lever is moved forward, the opposite extreme position, the harness is locked and the straps are drawn firmly to the seat whereby the pilot's body is restricted against movement relative thereto.

The foregoing harness apparatus and operating lever 111 thereof are admittedly old and per se not a part of this invention. However, the invention does contemplate and includes the provisions for such a device and proposes means for the predetermined, automatic operation of the device in conjunction with the levers 80. To this end, the lever 111 is so positioned on the seat relative to the levers 80 that movement of one or both of the levers to their operative position serves to automatically and concurrently move the lever 111 to its locked position. More particularly, the forward or leading edge of one of the levers 80 is formed with a cam surface 112 so shaped that when the lever 80 is disposed in its down or inoperative position, the operating lever 111 is free for unrestricted manual movement to and from its locked position. Upon the movement of the lever 80 to its operative position, the cam surface 112 strikes the lever 111 and moves it forward to its locked position if it has not already been so positioned manually by the pilot. Thus, when the levers 80 are raised to their operative position and the trigger assembly 96 is armed or cocked to permit the firing of the catapult, the harness apparatus must, of necessity, be locked to secure or pin the pilot firmly in the seat 10.

Since the pilot throughout flight may be, and during the ejection operation is, strapped or tied to the seat 10 by the harness apparatus, it is desirable to provide means automatically operable at the desired moment for the release of such apparatus. Hence, a trip lever 113 is provided at the lower aft end of the seat 10. This trip lever 113 is pivotally connected to the bottom of the seat 10 by means of a pin 114 connected to the outer ends of a fork bracket 115. The trip lever 113 is spring-loaded tending always to move in the direction of the seat. However, this trip lever 113 is so positioned and arranged that, in ejection, it strikes a projection or stop (not shown) carried by any convenient, fixed structure at the upper end of the fuselage or by the fixed tracks A or rails B. When the lever 113 thus contacts the stop, it is forced outwardly of the seat to energize a conventional electric time circuit which ultimately unlocks or disconnects the belts or harness apparatus which, up to now, have strapped the pilot to the seat. It is contemplated that the time device for the delayed operation of the harness release be such as to operate at the precise instant the seat 10 reaches its point of maximum trajectory.

What is claimed is:

1. In combination with a catapult mechanism carried by and mounted within an airplane for the ejection of a pilot therefrom during flight including means for normally locking said mechanism against operation, of a seat comprising an assembly of sheet material formed to create recessed flat bottom and transversely disposed arcuate back-supporting surfaces, an adjustable arm rest pivotally connected to its opposed sides, a head rest fixedly secured to its top and having an arcuate cross-section conforming generally to the shape of the pilot's head, a plurality of skid blocks mounted on and carried by the seat and organized and arranged for sliding co-action with a complementary mounting and guide member secured to associated structure of the airplane, an extensible member fixed at one of its ends against movement relative to the airplane and at its other end to the seat, pilot-controlled means operative on said extensible member to vary its length whereby the skid blocks are moved over the mounting and guide member to thereby adjust the position of the seat in the airplane, means for connecting the effective end of the catapult mechanism to the seat, a normally inoperative trigger operative to disengage the locking means for the catapult mechanism, and a lever assembly under the control of the pilot to simultaneously dispose and lock the arm rests in a fixed predetermined position relative to the seat and automatically render the trigger operative.

2. In combination with a catapult mechanism carried by and mounted within an airplane for the ejection of an airman therefrom during flight including means for normally locking said mechanism against operation, of a seat for said airman comprising an assembly of sheet metal formed to create recessed bottom and back-supporting surfaces, an adjustable arm rest pivotally connected to opposite sides of the seat assembly, a mounting and guide member secured to internal structure of the airplane adjacent the seat assembly and co-extensive with said back-supporting surface, a plurality of skids carried by the seat assembly and organized and arranged for sliding co-action with said mounting and guide member, a mount forming an integral part of the seat assembly adjacent the top thereof to connect the effective end of the catapult mechanism to the seat assembly, a drive connected at one of its ends to said mount and at its other end to the seat assembly, a selective control for the operation of said drive whereby the skids are moved over the mounting and guide member to thereby adjust the position of the seat assembly in the airplane, a normally inoperative trigger to effect in sequence disengagement of the locking means for the catapult mechanism and operation of the catapult, and a lever assembly under the control of the airman to simultaneously dispose and lock the arm rests in a predetermined position relative to the seat and automatically render said trigger operative.

3. In combination with an airplane having a normally inactive catapult mechanism secured at one of its ends to and positioned within the airplane, of a pilot's seat mounted in the airplane, a yoke symmetrically disposed transversely of the seat and adapted to receive the free end of the catapult mechanism at its center, a connection between the yoke and the seat whereby the seat is jettisoned from the airplane upon operation of the catapult mechanism, selective extension means associated with said connection to adjust the position of the seat relative to the yoke and the airplane, a pilot's control lever fixed to and carried by the seat, and an inoperatively disposed trigger assembly to activate the catapult mechanism mounted on said control lever for movement in unison therewith to its operative position.

4. In combination with an airplane having a power catapult mounted in the airplane, of a pilot's seat within the airplane comprising mounting means for the connection of the seat to the airplane, control means operative on said mounting means for the movement thereof whereby the position of the seat is selectively adjusted, a fixed mount adapted to receive the discharge end of the catapult whereby the seat is jettisoned from the airplane upon operation of the catapult, a pilot-controlled actuator operative to arm the catapult, and a normally inoperative trigger assembly associated with said actuator to fire the catapult, said trigger assembly being automatically connected for operation upon the completion of operation of the actuator.

5. In an airplane the combination with a catapult secured at one of its ends to, and disposed within, the airplane, of a pilot's seat, a mount on the seat to receive and connect the free end of the catapult thereto, a slidable connection operative between the seat and internal structure of the airplane, means under the control of the pilot and forming an integral part of the seat operative on said connection to selectively adjust its position relative to said internal structure of the airplane, an actuator for the operation of the catapult whereby the seat is jettisoned from the airplane, and a pilot's control lever mounted on the seat and connected to the actuator whereby movement in one direction operatively disconnects the actuator from the catapult and in the other direction operatively connects the actuator to the catapult.

6. In an airplane the combination with a catapult mechanism disposed within the airplane, of a pilot's seat, a guide secured to the airplane adjacent the seat, means forming a part of the seat operative between said seat and said guide for the interconnection thereof against relative movement, a drive operative on said means to vary its location with respect to the guide, a mount fixed to and carried by the seat for the connection thereof to the effective end of the catapult mechanism, and a pilot's control to initiate operation of the catapult mechanism whereby the seat is jettisoned from the airplane.

7. In an airplane the combination with a stationary power catapult releasably locked against operation and disposed within the airplane, of an ejection seat, a mounting and guide track secured to internal structure of the airplane adjacent said seat, a plurality of phenolic blocks carried by said seat, each organized and arranged to project into said mounting and guide track, a drive operative on said seat to move it on said blocks over said track, a mount fixed to and carried by the seat for the connection thereof to the discharge end of the catapult, and a pilot's control to unlock the catapult.

8. In an airplane the combination with a normally locked catapult mechanism fixedly disposed within the airplane, of an ejection seat, an immovable mounting and guide rail carried by internal, fixed structure of the airplane adjacent each side of said seat and co-extensive with the back of said seat, a set of complementary skid blocks fixed to and carried by the seat at spaced intervals along a common plane to engage and receive said rails, a mount connecting the seat to the effective end of the catapult mechanism, a drive connected to for operation between fixed structure of the airplane and the seat to move said seat on the blocks over their rails relative to the mount and catapult mechanism, a pilot's control lever pivotally connected to the seat, a normally inoperative initiator to unlock the catapult mechanism for operation, and means operative between said control lever and said initiator to render the latter operative upon operation of the former.

9. In an airplane the combination with a normally inoperative catapult mechanism mounted within the airplane, of a pilot's seat, means composed of a highly abrasive resistant material secured to and carried by said seat to engage and coact with complementary means carried by the associated structure of the airplane, an extensible member fixed at one of its ends to the airplane and at its opposed end to the seat, a pilot's control for the operation of said extensible member whereby the location of the abrasive means is varied relative to the complementary means for the adjustment of the position of the seat in the airplane, a normally disconnected control to render the catapult mechanism operative, a control lever mounted on the seat to connect said catapult control for operation, and a connection operative between said lever and the seat to prevent accidental operation of said lever.

10. In an airplane the combination with a stationary catapult disposed within the airplane, of a seat, at least one pair of spaced guide members secured to internal structure of the airplane adjacent the seat, a plurality of skid blocks carried by the seat for sliding co-action with said guide members, a variable length power means connected at one of its ends to the seat, a mount connected to the other end of said power means adapted to receive and connect the effective end of the catapult, a pilot control for the operation of said power means whereby the position of the seat is adjusted relative to the mount and the airplane, an actuator for the operation of the catapult whereby the seat is jettisoned from the airplane, and a lever mounted on the seat and connected to the actuator operable in one direction to disconnect the actuator from the catapult and in the other direction to connect the actuator to the catapult.

11. In an airplane the combination with a catapult disposed within the airplane, of a pilot's seat, a mount on said seat to receive and connect the effective end of the catapult, a slidable connection operative between the seat and fixed internal structure of the airplane, means under the control of the pilot and forming an integral part of the seat operative on said connection to selectively adjust its position relative to the associated fixed structure of the airplane, a lever pivotally connected at either side of the seat, an interconnecting rod between said levers for the operation thereof in unison, and a normally inoperative actuator automatically rendered operative upon the operation of said levers for the operation of the catapult whereby the seat is jettisoned from the airplane.

12. An ejection seat for the pilot of an airplane during flight comprising an assembly of sheet metal formed to create recessed, substantially flat bottom and arcuate back rest elements, structural beams removably secured to and co-extensive with the back of the seat, each of said beams being formed in a hollow box construction, a guide adapted to be employed as a stationary part of the airplane one for each beam, means complementary to each guide carried by said beams for sliding coaction with said guide, a drive connected to and operative between fixed structure of the airplane and said means whereby the position of the seat assembly is vertically adjustable relative to said guide, a mount fixed to and carried by the seat assembly for the connection thereof to a power catapult, means normally operative to lock the power catapult against operation, and a pilot's control to sequentially unlock said normally operative means and fire the catapult on and against said mount.

13. An ejection seat for the pilot of an airplane during flight comprising an assembly of sheet metal formed to create recessed, substantially flat bottom and arcuate back rest elements, a pair of removable and replaceable structural beams secured to the back of the seat in spaced relationship one with the other and coextensive with said back of the seat, each of said beams being formed in a hollow box construction, guides secured to the airplane and disposed in the space between said beams, skids fixedly mounted on adjacent faces of said beams to engage in opposition and slide on said guides, a drive connected at one end to fixed structure of the airplane and at the other end to the beams for movement of the beams on the skids upon operation of the drive to thereby vary the location of the skids with respect to the guides whereby the position of the seat assembly is selectively adjusted in the airplane, a mount fixed to and carried by the seat for the connection thereof to the effective end of a catapult mechanism, and a pilot's control for the operation of the catapult mechanism on and against said mount.

14. An ejection seat for the pilot of an airplane during flight comprising an assembly of sheet metal formed to create recessed bottom and backsupporting elements, a pair of removable and replaceable structural beams secured to and coextensive with the back of the seat, a support and guide secured to the airplane adjacent each of said beams, means carried by said beams to project therefrom and to engage said guides in overlapping and sliding contact, power means operative between fixed structure of the airplane and said means to move them on and over said guides whereby the position of the seat assembly is selectively adjusted in the airplane, a mount forming an integral part of the seat assembly for the connection to a power catapult, a pilot's control lever pivotally mounted on the seat assembly for controlling the operation of the catapult on and against said mount, and an off-center locking link interconnecting said lever to its pivotal connection on the seat assembly to prevent accidental movement of said lever.

15. A seat for the ejection of the pilot from an airplane during flight comprising an assembly of sheet metal formed to create a flat bottom and a hollow box constructed back the forward surface of which is transversely arcuate, an adjustable arm rest at either side of said back medially of its length, a plurality of fixed phenolic skids organized and arranged for sliding coaction with a complementary mounting and guide member forming a fixed part of the associated structure in the airplane, a drive mechanism for movement of the seat on said skids for the adjustment thereof relative to the airplane, a stationary mount for the connection of the seat to the effective end of a normally inoperative catapult mechanism, a hollow pilot's control lever mounted for rotation adjacent each arm rest whereby movement of said levers concurrently raises said arm rests to a position parallel with the seat bottom, said levers when so disposed forming continuation of the sides of the seat, a mounting connection associated with each lever to prevent the accidental operation thereof, an interconnecting rod between said control levers for the operation thereof in unison, a normally inoperative initiator housed within at least one of said control levers to render the catapult mechanism operable, a normally unlocked trigger mechanism housed within at least one of said control levers to activate the catapult mechanism whereby the seat is jettisoned from the airplane, and interconnecting linkage between one of the control levers, the initiator and the trigger mechanism to sequentially render said initiator operative and unlock said trigger mechanism upon movement of said control levers to raise said arm rest as aforesaid.

16. An emergency ejection seat for the pilot of an airplane during flight comprising an assembly of sheet metal formed to create a bottom and a back, adjustable arm rests on either side of said back, a head rest of energy-absorbing material mounted on the top of said back and adapted to receive and cushion the back of the pilot's head, a plurality of skids secured to and projecting from the seat to be received in a complementary track carried by associated internal structure of the airplane, a yoke symmetrically disposed transversely of the seat, a mount integrally formed on the center of the yoke to receive and connect the effective end of a catapult mechanism secured to the airplane, a screw jack assembly connecting said yoke to the seat, an electric motor carried by the yoke, the operation of which is controlled by a switch located on the seat adjacent one of the arm rests whereby the position of the seat is adjusted by the movement of the skids in the track, a hollow control lever pivotally mounted on the seat adjacent each arm rest whereby rotation thereof in one direction simultaneously adjusts and locks the associated arm rest in a position parallel with the bottom of the seat, interconnecting means between said levers for the rotation thereof in unison, a normally inoperative initiator housed within one of said control levers to render the catapult mechanism operable, a normally inoperative actuating lever pivotally mounted within one of the control levers and extending outwardly therefrom for the operation of the catapult mechanism, and means disposed within the levers and operable on said initiator and said actuating lever to render them sequentially operative in response to rotation of said control levers in the direction to adjust and lock the arm rests in a position parallel to the bottom of the seat as aforesaid.

17. In an airplane the combination with a catapult releasably locked against operation and fixedly mounted within the airplane, of a pilot's ejection seat, a guide secured to the airplane on either side of the seat, means forming a part of the seat operative between said seat and said guide for the interconnection thereof against relative movement, a drive operative on said means to vary its location with respect to the guide whereby the position of the seat is adjusted in the airplane, a mount fixed to and carried by the seat for the connection thereof to the effective end of the catapult, a hollow pilot's control lever pivotally connected to the seat, a normally inoperative initiator housed within said control lever to unlock the catapult for operation, and means operative between said control lever and said initiator to render the latter operative only upon operation of the former.

18. In an airplane the combination with a catapult releasably locked against operation and forming a stationary part of the airplane, of a pilot's ejection seat, a guide secured to the airplane on either side of the seat, means forming a part of the seat operative between said seat and said guide for the interconnection thereof against relative movement, a drive operative on said means to vary its location with respect to the guide whereby the position of the seat is adjusted in the airplane, a mount fixed to and carried by the seat for the connection thereof to the effective end of the catapult, a hollow control lever pivotally mounted on each side of the seat, a torque tube interconnecting corresponding ends of said levers for the operation thereof in unison, normally inoperative independent initiators housed within at least one of said control levers to arm the catapult for operation and to fire said catapult, and linkage interposed between the levers and the initiators to render said initiators operative in sequence upon operation of said levers.

19. In combination with an airplane having a normally inactive power catapult mechanism fixedly mounted therein, of a yoke connected at its center to the outer discharge end of the catapult, a pilot's seat, a screw jack connected to each end of the yoke and to the corresponding side of the seat, a control for the actuation of the screw jacks in unison whereby the position of the seat is adjusted relative to the yoke and to the airplane, a normally disconnected control operative upon connection to energize the catapult mechanism, and pilot-controlled means operative to connect said normally disconnected control for operation whereby the catapult mechanism may be fired on and against the yoke to thereby jettison the seat from the airplane.

20. In combination with an airplane having a normally inoperative catapult mechanism secured at one of its ends to and positioned within the airplane, of a mount connected to the free end of the catapult, a pilot's seat, variable length means connecting the mount to the seat and operative to adjust the position of the seat relative to the mount and to the airplane, a normally inoperative control operative to energize the catapult mechanism, and pilot-controlled means to render said control operative whereby the catapult mechanism may be fired and the seat thereby ejected from the airplane.

References Cited in the file of this patent

UNITED STATES PATENTS

| | | |
|---|---|---|
| 2,459,948 | Lobelle | Jan. 25, 1949 |
| 2,541,087 | Musser | Feb. 13, 1951 |
| 2,726,831 | Bleck et al. | Dec. 13, 1955 |
| 2,755,042 | Paddon | July 17, 1956 |